United States Patent
Zapf et al.

(10) Patent No.: US 9,534,157 B2
(45) Date of Patent: Jan. 3, 2017

(54) COMPOSITION FOR AN ADHESIVE MATERIAL

(71) Applicant: VACUUMSCHMELZE GMBH & CO. KG, Hanau (DE)

(72) Inventors: Lothar Zapf, Alzenau (DE); Markus Brunner, Bessenbach (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 12 days.

(21) Appl. No.: 14/172,695

(22) Filed: Feb. 4, 2014

(65) Prior Publication Data

US 2014/0221530 A1    Aug. 7, 2014

(30) Foreign Application Priority Data

Feb. 6, 2013  (DE) .................. 10 2013 201 958

(51) Int. Cl.

| | | |
|---|---|---|
| *C09J 163/00* | (2006.01) | |
| *C09J 163/04* | (2006.01) | |
| *C08L 63/00* | (2006.01) | |
| *C08L 63/04* | (2006.01) | |
| *C08G 59/38* | (2006.01) | |
| *C08G 59/68* | (2006.01) | |
| *C09J 109/02* | (2006.01) | |
| *C08G 59/50* | (2006.01) | |

(52) U.S. Cl.
CPC .......... *C09J 163/00* (2013.01); *C08G 59/5073* (2013.01); *C08G 59/686* (2013.01); *C09J 109/02* (2013.01)

(58) Field of Classification Search
USPC ......... 523/427, 461; 525/523, 524, 525, 526
See application file for complete search history.

(56) References Cited

U.S. PATENT DOCUMENTS

| | | | | |
|---|---|---|---|---|
| 4,500,660 | A * | 2/1985 | Minamisawa et al. ....... | 523/428 |
| 5,302,666 | A * | 4/1994 | Hino et al. ................... | 525/113 |
| 5,317,068 | A * | 5/1994 | Watanabe et al. ............ | 525/526 |
| 8,564,391 | B2 * | 10/2013 | Zapf ............................. | 335/306 |
| 8,702,898 | B2 * | 4/2014 | Zapf ............................. | 156/330 |
| 8,717,130 | B2 * | 5/2014 | Zapf ............................. | 335/306 |

FOREIGN PATENT DOCUMENTS

| | | |
|---|---|---|
| DE | 69930351 T1 | 10/2006 |
| WO | 2007059152 A1 | 5/2007 |

OTHER PUBLICATIONS

Office Action for corresponding German Application DE 10 2013 201 958.0 dated Sep. 19, 2013.

\* cited by examiner

*Primary Examiner* — Michael J Feely

(74) *Attorney, Agent, or Firm* — Dickinson Wright PLLC

(57) ABSTRACT

A composition for an adhesive material, comprising at least one epoxide resin mixture and a hardening accelerator, in which the epoxide resin mixture has 25 to 80% by weight of a first epoxide resin—whereby the first epoxide resin is a bifunctional aliphatic, cycloaliphatic or aromatic epoxide resin—and 12.5 to 40% by weight of a second epoxide resin—whereby the second epoxide resin is a polyfunctional aliphatic or aromatic epoxide resin—and in which the hardening accelerator is an imidazole derivative, which is not soluble in the epoxide resin mixture at temperatures of below 50° C.

14 Claims, No Drawings

COMPOSITION FOR AN ADHESIVE MATERIAL

This application claims benefit of the filing date of DE 10 2013 201 958.0, filed Feb. 6, 2013, the entire contents of which is incorporated herein by reference for all purposes.

BACKGROUND

1. Field

Disclosed herein is a composition for an adhesive material and a use of this composition in particular for gluing electronic components.

2. Description of Related Art

In the manufacturing of inductive components, adhesives are required for a wide variety of joining and assembly processes. In this case, materials based on a wide variety of chemicals are commonly used both in ready-to-use single-component formulations and in multi-component formulations, which are to be mixed only immediately before use. In turn, the latter can be categorized as room-temperature-hardening systems and as adhesive materials that harden at elevated temperatures.

For applications with increased requirements with regard to adhesive strength and temperature stability, here in general adhesives based on epoxide resins have gained acceptance in practice. Because of their significantly simpler handling, which from the start eliminates processing errors due to inadequate mixing conditions or insufficiently thorough mixing, single-component adhesives, especially in the case of thixotropic or paste-like adhesive materials, are significantly more common than the two- or multi-component products that predominate in the case of materials—especially casting resins with lower viscosity.

While it is generally readily possible—in the case of the adhesives that are to be mixed and that consist of several separate components—to adapt to the most varied requirements such as shelf life or limited hardening temperatures, here finish-formulated single-component systems are subject to significantly more extensive limitations. In electronics manufacturing, it is absolutely imperative to avoid premature aging of the components to be processed or their soldered connections. As a consequence, it is necessary to use adhesives with the lowest possible hardening temperature and the shortest possible hardening time. While this is unproblematic in the case of two-component systems that are to be mixed, in the case of single-component adhesives, the problems exist in principle that at low temperatures, fast-hardening adhesives have an adequate shelf life only at very low temperatures or that mixtures with a long shelf life at room temperature generally require hardening temperatures around or above 150° C., which in turn has a very disadvantageous effect on the properties of the electronic components to be processed, especially their subsequent solderability.

To solve this problem, a commonly used approach for single-component adhesives is the use of a combination of hardeners with hardening accelerators that are generally soluble in the resin components only at elevated temperatures, which accelerators are activated only at elevated temperatures in a chemically active form, e.g., by cleavage of a low-molecular compound that blocks the active group. As standard hardeners for these applications, engineering practice has adopted finely-ground (micronized) dicyandiamide, which without additional hardening accelerators makes possible mixtures that have a good shelf life but that require hardening temperatures of above 150° C.

For reduction of the hardening temperature, catalysts based on substituted urea derivatives, such as, for example, 3-(4-chlorophenyl)-1,1-dimethylurea (monuron) or 3-(3,4-dichlorophenyl)-1,1-dimethylurea (diuron) in amounts of below 1% by weight, relative to the amount of resin, are commonly used. With these additional accelerators, hardening temperatures in the range starting from about 120° C. are accessible.

Another technically-established variant is the use of blocked amine or imidazole complex compounds. Typical representatives of these two substance classes were, for example, zinc-bis[(tetramethylguanidine)-(2-ethylhexanoate)] or, for example, zinc-bis[(1-methylimidazole)-(2-ethylhexanoate)]. Even when using these complex compounds, which are added in amounts of typically 0.1 to 1% of the formulation, hardening temperatures starting from approximately 120° C. in connection with dicyandiamide are possible. It has been shown, however, that these adhesives, hardened with dicyandiamide and optionally additional hardening accelerators, specifically meet the requirements for a sufficiently low hardening temperature with good adhesion to typical structural materials and good long-term temperature stability, but typically only achieve creepage current resistance values in the range of 350 to 450 V in the examination of creepage current resistance according to DIN EN 60112, and thus are to be assigned to the insulating material class II or IIa. This is disadvantageous to the extent that for the manufacturing of inductive components, there are a number of structural plastics that achieve creepage current resistance values of greater than 600 V and thus insulating material class I. If these plastics (e.g., polyamide 6,6, polyamide 6,6T or polybutylene terephthalate) are used as insulating materials and at the same time an adhesive connection of various components is performed, it is no longer the higher-grade material of the insulating material class I but rather the considerably poorer adhesive of the insulating material class II or IIa that determines the necessary geometric minimum gaps (creepage distances) and thus the component sizes.

SUMMARY

There remains a need in the art for compositions that eliminate the above-mentioned drawbacks. Embodiments of the invention disclosed herein satisfy this need.

One embodiment relates to a composition for an adhesive material is provided, which comprises at least one epoxide resin mixture and a hardening accelerator, in which the epoxide resin mixture has (a) 25 to 80% by weight of a first epoxide resin, whereby the first epoxide resin is a bifunctional aliphatic, cycloaliphatic or aromatic epoxide resin; and (b) 12.5 to 40% by weight of a second epoxide resin, whereby the second epoxide resin is a polyfunctional aliphatic or aromatic epoxide resin, and in which the hardening accelerator is an imidazole derivative, which is not soluble in the epoxide resin mixture at temperatures of below 50° C. The sum of the components of the epoxide resin mixture yields 100% by weight.

It has been shown that this composition can be formulated as a single-component adhesive material. At room temperature, the composition has a shelf life of at least three months and nevertheless can be hardened at temperatures starting from 100° C. The composition that is now presented meets the requirements of the insulating plastic class I. It has a glass transition temperature of above 110° C. It also exhibits very good adhesion to typical electrical engineering structural materials as well as good temperature stability and good resistance to thermal shocks.

In addition to the first epoxide resin and the second epoxide resin, the epoxide resin mixture can comprise (c) 12.5 to 40% by weight of an epoxidized rubber. The sum of the components of the epoxide resin mixture yields 100% by weight.

It has been shown that by means of the composition presented herein, adhesive materials, which are cross-linked in the hardened state essentially via a polyether structure and which have creepage current resistance values of greater than 600 V according to DIN EN 60112, can be formulated by anionic homopolymerization of the epoxide resin mixture. As initiators for this anionic polymerization, imidazole derivatives, which are not soluble in the epoxide resin mixture at temperatures of below 50° C., are provided. Comparison tests with imidazole derivatives, which are soluble in the epoxide resin mixture at temperatures of below 50° C., have revealed that such compositions have a shelf life of only a few days.

The composition presented herein can be produced in a way that is known in the art by mixing and homogenizing the components at room temperature. If the first epoxide resin is a liquid epoxide resin, the additional components of the composition, for example the second epoxide resin, can thus be dissolved in the first epoxide resin. The hardening accelerator does not dissolve at room temperature in the first epoxide resin or the epoxide resin mixture. In order to ensure the homogeneous distribution of the hardening accelerator in the epoxide resin mixture, it is present in, for example, micronized form.

By heating the composition to a temperature of above 100° C., the composition can ultimately be hardened, causing a hardened adhesive material to be obtained, which can connect components in an adhesive manner.

Because of their excellent properties, the composition that is presented herein is suitable in particular as an adhesive for electronic components.

Below, the components of the compositions are described in detail.

DETAILED DESCRIPTION OF SPECIFIC EMBODIMENTS

First Epoxide Resin

The first epoxide resin is a bifunctional aliphatic, cycloaliphatic or aromatic epoxide resin. For example, the first epoxide resin is an epoxide resin that is liquid at room temperature.

In one embodiment, the first epoxide resin is selected from the group that consists of epoxide resins of the bisphenol A type, epoxide resins of the bisphenol F type, epoxide resins based on bis-(epoxycyclohexyl)methylcarboxylate, epoxide resins based on hydrophthalic acid diglycidyl ester, and mixtures thereof. For example, epoxide resins based on bisphenol A and/or bisphenol F have an average molecular weight of <700 g/mol.

The first epoxide resin has, for example, an epoxide group content of 0.1 to 0.9 mol/100 g of the first epoxide resin. For example, if the first epoxide resin is an epoxide resin based on bisphenol A and/or bisphenol F, the first epoxide resin can have an epoxide group content of 0.4 to 0.7 mol/100 g of the first epoxide resin.

Second Epoxide

The second epoxide resin is a polyfunctional aliphatic or aromatic epoxide resin. This component provides for a sufficiently high thermal resistance and bonding strength of the epoxide resin mixture at elevated temperatures.

The second epoxide resin is soluble, for example, in the first epoxide resin. It is, for example, an epoxide resin that is solid, or semi-solid, or liquid at room temperature.

In another embodiment, the second epoxide resin is selected from the group that consists of epoxy phenol novolacs, epoxy cresol novolacs, or polyfunctional epoxide resin derivatives of aromatic amines or phenols. Representative examples of the second epoxide resin are 4,4'-methylene-bis(N,N-diglycidylaniline) (CAS No. 28768-32-3), N,N-diglycidyl-4-glycidyloxyaniline (CAS No. 5026-74-4), polyglycidyl diaminodiphenyl ethers, and polyglycidyl diaminodiphenyl sulfones. If the second epoxides are epoxy phenol novolacs and/or epoxy cresol novolacs, these novolacs have, for example, an epoxy functionality of greater than 2. Also, as second epoxides, comparable polyfunctional resins can be used, which are used for increasing the cross-linking density of the first epoxide resin.

In another embodiment, the second epoxide resin is an epoxide resin with an epoxide group content of 0.3 to 1.0 mol/100 g of the second epoxide resin. In another embodiment, the second epoxide resin has an epoxy functionality of 2 to 10 epoxide resin groups per molecule.

Epoxidized Rubber

Moreover, the epoxide resin mixture can comprise an epoxidized rubber. Such a rubber is a bifunctional resin that contains epoxidized, flexible chain segments. By means of such an epoxidized rubber, a marked improvement of the adhesion of the adhesive material, for example to polyamide, can be achieved. In addition, the impact resistance of the hardened adhesive material can be improved.

The epoxidized rubber is, for example, an epoxidized acrylonitrile-butadiene rubber, for example an epoxidized nitrile rubber (also referred to as epoxidized NBR rubber), and, for example, an epoxidized nitrile rubber that is liquid at room temperature. An exemplary liquid nitrile rubber has at least one of the following features:

An epoxide group content of 0.1 to 0.5 mol/100 g of epoxidized nitrile rubber, for example 0.2 to 0.4 mol/100 g of epoxidized nitrile rubber;

A viscosity of greater than 10,000 mPa·s, for example 40,000 to 600,000 mPa·s;

A proportion of nitrile rubber in the epoxidized nitrile rubber of at least 5% by weight, for example 20 to 50% by weight.

Hardening Accelerator

The provided hardening accelerator is an imidazole derivative, which is not soluble in the epoxide resin mixture at temperatures of below 50° C. For example, the hardening accelerator is solid at temperatures of below 50° C.

Exemplary imidazole derivatives are selected from the group that consists of 2-phenyl-4,5-dihydroxymethyl imidazole, 2-phenyl-4-methyl-5-hydroxymethyl imidazole, and mixtures thereof.

For example, the hardening accelerator is present in the composition in an amount of 2 to 10% by weight, relative to the epoxide resin mixture. The hardening accelerator is present in the composition, for example, in the form of a micronized solid.

Optional Additional Components of the Composition

Optionally, the composition presented herein can comprise additional components. Thus, the composition can contain rheological additives known to one skilled in the art, e.g., layer silicates (bentonite) or pyrogenic silicic acid, for adjusting the desired paste-like properties. For reduction of the thermal expansion, the composition can contain the conventional mineral additives based on oxide, hydroxide, carbonate, or silicate, such as, for example, silicon dioxide, calcium carbonate, aluminum oxide, magnesium silicate, aluminum silicate, calcium silicate, or fillers that have a similar effect and that are known to one skilled in the art.

The invention is explained in more detail below based on the embodiments (examples) and comparison examples.

Example 1

A composition with the following components was produced:
30 g of DOW 331 (bisphenol A standard resin, supplier DOW Chemicals)
30 g of Polydis 3614 (epoxidized NBR rubber, supplier Schill+Seilacher)
30 g of Tetraglycidyl methylenedianiline
4 g of 2-Phenyl-4,5-dihydroxymethyl imidazole
10 g of Bentone 27 (rheological additive, supplier Elementis)

After mixing and homogenizing the individual components together, a paste-like composition that has a long shelf life of more than 5 months at room temperature and that can harden in one hour at 120° C. was obtained for use as an adhesive material. The composition filled gaps up to 5 mm wide. The hardened adhesive material had a creepage current resistance value of greater than 600 V and a glass transition temperature of 132° C. (measured with Mettler DCS).

Example 2

A composition with the following components was produced:
50 g of CHS 590 (bisphenol F standard resin, supplier SPOL Chemie)
25 g of Polydis 3615 (epoxidized NBR rubber, supplier Schill+Seilacher)
25 g of Tetraglycidyl-4,4'-diaminodiphenyl ether
6 g of 2-Phenyl-4,5-dihydroxymethyl imidazole
10 g of Bentone 27 (rheological additive, supplier Elementis)

After mixing and homogenizing the individual components together, a paste-like composition that has a long shelf life of more than 5 months at room temperature and that can harden in three hours at 100° C. was obtained as an adhesive material. The composition filled gaps up to 5 mm wide. The hardened adhesive material had a creepage current resistance value of greater than 600V and a glass transition temperature of 121° C. (measured with Mettler DCS).

Example 3

A composition with the following components was produced:
50 g of CHS 590 (bisphenol F standard resin, supplier SPOL Chemie)
25 g of Polydis 3615 (epoxidized NBR rubber, supplier Schill+Seilacher)
25 g of Araldite EPN 1138 (epoxidized phenol novolac, supplier Huntsman)
8 g of 2-Phenyl-4-methyl-5-hydroxymethyl imidazole
10 g of Bentone 27 (rheological additive, supplier Elementis)
100 g of Martinal ON-320 (aluminum hydroxide, supplier Albemarle)

After dissolving, mixing and homogenizing the individual components together, a paste-like composition that has a long shelf life of more than 5 months at room temperature and that can harden in one hour at 120° C. was obtained for use as an adhesive material. The composition filled gaps up to 5 mm wide. The hardened adhesive material had a creepage current resistance value of greater than 600 V and a glass transition temperature of 128° C. (measured with Mettler DCS).

Example 4

A composition with the following components was produced:
45 g of CHS 590 (bisphenol F standard resin, supplier SPOL Chemie)
35 g of Polydis 3614 (epoxidized NBR rubber, supplier Schill+Seilacher)
20 g of Araldite ECN 1299 (epoxidized cresol novolac, supplier Huntsman)
7 g of 2-Phenyl-4-methyl-5-hydroxymethyl imidazole
10 g of Bentone 27 (rheological additive, supplier Elementis)
70 g of Martinal ON 320 (aluminum hydroxide, supplier Albemarle)
20 g of Tremin 939 (wollastonite, supplier Quarzwerke)

After dissolving, mixing and homogenizing the individual components together, a paste-like composition that has a long shelf life of more than 5 months at room temperature and that can harden in one hour at 120° C. was obtained for an adhesive material. The composition filled gaps up to 5 mm wide. The hardened adhesive material had a creepage current resistance value of greater than 600 V and a glass transition temperature of 122° C. (measured with Mettler DCS).

Comparison Example 1

A composition with the following components was produced:
50 g of CHS 590 (bisphenol F standard resin, supplier SPOL Chemie)
25 g of Polydis 3615 (epoxidized NBR rubber, supplier Schill+Seilacher)
25 g of Tetraglycidyl-4,4'-diaminodiphenyl ether
2 g of 1-Cyanoethyl-2-ethyl-4-methylimidazole
10 g of Bentone 27 (rheological additive, supplier Elementis)

The composition hardened for an hour at 120° C. and filled gaps up to 5 mm wide. The hardened adhesive material had a creepage current resistance, value of greater than 600 V and a glass transition temperature of 124° C. (measured with Mettler DCS).

In Comparison Example 1, an imidazole derivative that is soluble in resin at room temperature was used as hardening accelerator instead of the solid imidazole derivatives that are described in the examples and that are not soluble in the resin matrix at room temperature. In this case, in the hardened state, adhesive materials with properties comparable to those in the examples were obtained; however, the paste-like adhesive material had a service life of only 3 to 5 days at room temperature.

Comparison Example 2

A composition with the following components was produced:

50 g of Araldite GY 285 (bisphenol F standard resin, supplier Huntsman)

40 g of Polydis 3615 (epoxidized NBR rubber, supplier Schill+Seilacher)

3.5 g of 2-Phenyl-4-methyl-5-hydroxymethyl imidazole 10 g of Bentone 27 (rheological additive, supplier Elementis)

After mixing and homogenizing the individual components, a paste-like composition that has a long shelf life of more than 5 months at room temperature and that can harden in one hour at 120° C. was obtained for an adhesive material. The composition filled gaps up to 5 mm wide. The hardened adhesive material had a creepage current resistance value of greater than 600 V and a glass transition temperature of 82° C. (measured with Mettler DCS).

In Comparison Example 2, the addition of the polyfunctional resin components was eliminated. Adhesive materials with a considerably lower glass transition temperature and thus considerably reduced adhesive strength at elevated ambient temperatures were thus obtained. All other properties, such as, for example, the creepage current resistance, remain unchanged, however.

Thus a composition or adhesive material—which can be formulated as a single-component composition, can harden even at temperatures starting from 100° C., and has a shelf life of at least three months at room temperature—is indicated.

The invention having been thus described by reference to certain specific embodiments and examples, it will be understood that these specific embodiments and examples are illustrative, and not limiting, of the invention recited in the appended claims.

The invention claimed is:

1. A composition for an adhesive material, comprising an epoxide resin mixture and an imidazole derivative component wherein the epoxide resin mixture comprises:
    (a) 25 to 75% by weight of a first epoxide resin, wherein the first epoxide resin is a bifunctional aliphatic, cycloaliphatic or aromatic epoxide resin;
    (b) 12.5 to 40% by weight of a second epoxide resin, wherein the second epoxide resin is a polyfunctional aliphatic or aromatic epoxide resin;
    (c) 12.5 to 40% by weight of an epoxidized rubber, wherein the sum of (a), (b), and (c) yields 100% by weight; and
    wherein the imidazole derivative component initiates homopolymerization of the epoxy resin mixture and is one or more imidazole derivatives, the imidazole derivative component is not soluble in the epoxide resin mixture at temperatures of below 50° C., and the imidazole derivative component is the only hardener present in the composition; and
    wherein the composition forms a hardened adhesive material having a polyether structure and a creepage current resistance value of greater than 600 V.

2. The composition according to claim 1, wherein the first epoxide resin is a liquid epoxide resin with an epoxide group content of 0.1 to 0.9 mol/100 g of the first epoxide resin.

3. The composition according to claim 1, wherein the first epoxide resin is selected from the group consisting of epoxide resins of the bisphenol A type, epoxide resins of the bisphenol F type, epoxide resins based on bis-(epoxycyclohexyl)methylcarboxylate, epoxide resins based on hydrophthalic acid diglycidyl ester, and mixtures thereof.

4. The composition according to claim 1, wherein the first epoxide resin has an epoxide group content of 0.4 to 0.7 mol/100 g of the first epoxide resin.

5. The composition according to claim 1, wherein the second epoxide resin is an epoxide resin with an epoxide group content of 0.3 to 1.0 mol/100 g of the second epoxide resin or an epoxy functionality of 2 to 10 epoxide resin groups per molecule, or both.

6. The composition according to claim 1, wherein the second epoxide resin is selected from the group consisting of epoxy phenol novolacs, epoxy cresol novolacs, and polyfunctional epoxide resin derivatives of aromatic amines or phenols.

7. The composition according to claim 1, wherein the second epoxide resin is 4,4'-methylene-bis(N,N-diglycidylaniline), N,N-diglycidyl-4-glycidyloxyaniline, a polyglycidyl diaminodiphenyl ether or a polyglycidyl diaminodiphenyl sulfone.

8. The composition according to claim 1, wherein the second epoxide resin is liquid, semi-solid or solid.

9. The composition according to claim 1, wherein the epoxidized rubber is an epoxidized nitrile rubber.

10. The composition according to claim 9, in which the epoxidized nitrile rubber is a liquid epoxidized nitrile rubber with at least one of the following features:
    an epoxide group content of 0.1 to 0.5 mol/100 g of epoxidized nitrile rubber;
    a viscosity of greater than 10,000 mPa·s;
    a proportion of nitrile rubber in the epoxidized nitrile rubber of at least 5% by weight.

11. The composition according to claim 9, wherein the epoxidized nitrile rubber is a liquid epoxidized nitrile rubber with at least one of the following features:
    an epoxide group content of 0.2 to 0.4 mol/100 g of epoxidized nitrile rubber,
    a viscosity of 40,000 to 600,000 mPa·s,
    a proportion of nitrile rubber in the epoxidized nitrile rubber of 20 to 50% by weight.

12. The composition according to claim 1, wherein the imidazole derivative component is present in the composition in an amount of 2 to 10% by weight, relative to the epoxide resin mixture.

13. The composition according to claim 1, wherein the imidazole derivative component is selected from the group consisting of 2-phenyl-4,5-dihydroxymethyl imidazole, 2-phenyl-4-methyl-5-hydroxymethyl imidazole, and mixtures thereof.

14. An adhesive for electric and electronic components, comprising a composition according to claim 1.

* * * * *